(12) United States Patent
Glück et al.

(10) Patent No.: US 6,387,968 B1
(45) Date of Patent: May 14, 2002

(54) METHOD FOR PRODUCING WATER EXPANDABLE STYRENE POLYMERS

(75) Inventors: Guiscard Glück, Mainz; Klaus Hahn, Kirchheim; Roland Gellert, Neustadt, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/623,479
(22) PCT Filed: Mar. 19, 1999
(86) PCT No.: PCT/EP99/01838
 § 371 Date: Sep. 14, 2000
 § 102(e) Date: Sep. 14, 2000
(87) PCT Pub. No.: WO99/48957
 PCT Pub. Date: Sep. 30, 1999

(30) Foreign Application Priority Data

Mar. 24, 1998 (DE) .......................................... 198 12 856

(51) Int. Cl.$^7$ .................................................. C08J 9/20
(52) U.S. Cl. ............................. 521/56; 521/60; 521/82
(58) Field of Search ............................. 521/56, 60, 82

(56) References Cited

U.S. PATENT DOCUMENTS

| | | | | |
|---|---|---|---|---|
| 4,812,484 A | * | 3/1989 | Endo et al. ................... 521/60 |
| 5,661,191 A | * | 8/1997 | Haraguchi et al. ............ 521/59 |
| 5,783,612 A | * | 7/1998 | Batscheider et al. .......... 521/98 |
| 5,880,166 A | * | 3/1999 | Gluck et al. .................. 521/59 |

* cited by examiner

*Primary Examiner*—Morton Foelak

(57) ABSTRACT

The invention relates to a process for preparing styrene polymers which comprise water as sole blowing agent, by polymerizing styrene in aqueous suspension in the presence of from 0.1 to 15% by weight of a solid substance insoluble in water and in styrene, for example carbon black or graphite.

6 Claims, No Drawings

METHOD FOR PRODUCING WATER EXPANDABLE STYRENE POLYMERS

The invention relates to a process for preparing water-expandable polystyrene (WEPS) by polymerizing styrene in aqueous suspension, where the suspended styrene droplets comprise an emulsion of finely dispersed water.

Expandable polystyrene (EPS) beads are usually prepared by polymerizing styrene in aqueous suspension in the presence of a volatile organic blowing agent. The usual blowing agents are hydrocarbons, in particular pentane. In order to protect the environment, pentane emitted during the production and processing of EPS has to be reclaimed. This is complicated and costly. In the longer term, therefore, it would be useful to replace these organic substances with blowing agents which are less hazardous, for example water.

The Eindhoven University 1997 dissertation by J. J. Crevecoeur "Water Expandable Polystyrene" describes a process for preparing WEPS by first preparing a fine emulsion of water in styrene with the aid of surface-active substances, polymerizing the styrene to a conversion of 50%, suspending the mixture in water with phase inversion, and finally polymerizing the styrene to completion with the aid of peroxide initiators. The surface-active substances used comprise amphiphilic emulsifiers, e.g. sodium [bis(2-ethylhexyl)sulfosuccinate] or sodium styrenesulfonate, or block copolymers made of polystyrene blocks and of polystyrenesulfonate blocks. All of these substances have both a hydrophilic and a hydrophobic radical and are therefore able to emulsify water in styrene.

A disadvantage of this process is that it is carried out in two stages: water is first emulsified in the styrene/polystyrene mixture and then the organic phase is suspended in water, with phase inversion.

It is an object of the present invention, therefore, to develop a simpler, single-stage process for preparing WEPS.

We have found that this object is achieved by adding, at the start of the suspension polymerization or during its course, from 0.1 to 15% by weight, based on the monomers, of an inorganic solid substance insoluble in water and in styrene and having an average particle size of not more than 100 μm and a density above 1.1 g/cm$^3$.

During the polymerization, gravity and centrifugal forces dictate that the particles of the solid substance continuously penetrate the interface between water phase and styrene phase and while doing this constantly carry adhering water droplets with them into the styrene phase. This is probably the basis for the action of the solids as emulsifying agents.

Preferred solid substance is carbon black with an average particle size of from 10 to 500 nm, depending on the type of carbon black. Even the preferred amounts of from 0.2 to 5% by weight of carbon black are effective. Another suitable substance is graphite with an average particle size (longest lamellar diameter) of from 2 to 20 μm. Active amounts are preferably from 0.4 to 10% by weight.

Other suitable substances are silica gel, silicates, e.g. talc or bentonite, metal oxides, e.g. $Al_2O_3$ and $TiO_2$, hydroxides, such as AlO(OH) and $Mg(OH)_2$, and also metal salts, such as $CaCO_3$, $Mg_3(PO_4)$ and $BaSO_4$.

In the novel suspension polymerization it is preferable for styrene alone to be used as monomer. However, up to 20% of the weight of styrene may have been replaced by other ethylenically unsaturated monomers, such as alkylstyrenes, divinylbenzene, acrylonitrile, 1,1-diphenylethene or α-methylstyrene.

In the suspension polymerization use may be made of the customary auxiliaries, e.g. suspension stabilizers, free-radical initiators, flame retardants, chain transfer agents, expansion aids, nucleating agents and plasticizers. It is advantageous for the suspension stabilizers used to be inorganic Pickering dispersing agents, e.g. magnesium pyrophosphate or tricalcium phosphate, combined with small amounts of alkylsulfonates. Preferred flame retardants are organic bromine compounds, such as hexabromocyclododecane, and the amounts of these added are from 0.1 to 2% by weight, based on the monomers.

It is advantageous to carry out the polymerization in the presence of from 1 to 30% by weight, preferably from 3 to 15% by weight, of polystyrene, and it is appropriate for this to be used as a solution in styrene. It is also possible to use recycled polystyrene material instead of pure polystyrene.

The solid substance is preferably added straight away at the start of the suspension polymerization, but it may also be fed during the course of the polymerization until the conversion is 90%.

It is appropriate for the suspension polymerization to be carried out in two temperature phases, using two peroxide initiators decomposing at different temperatures. The suspension is first heated to 80–90° C., whereupon the first peroxide, e.g. dibenzoyl peroxide, decomposes and the polymerization begins. The temperature is then allowed slowly to rise to 100–140° C., whereupon the second peroxide, e.g. dicumyl peroxide or di-tert-butyl perbenzoate, decomposes.

The WEPS beads produced during the suspension polymerization comprise, depending on the amount of recycled EPS material used and the content of coating agent, from 2 to 20% by weight, in particular from 5 to 15% by weight, of water. Their particle size is from 0.2 to 5 mm, preferably from 0.5 to 2 mm. They may be foamed using air at from 110 to 140° C. or superheated steam, to give foam beads. A particularly elegant foaming process which gives foam beads with a very low bulk density is described in the German Patent Application P 198 12 854.1.

The WEPS foam beads may, like conventional EPS foam beads, be fused to give foam sheets, foam slabs or foam moldings, each of which can be used as an insulating or packaging material.

All percentages in the examples are based on weight.

EXAMPLE 1

2.55 kg of polystyrene (PS 158 K from BASF) are dissolved in 17.03 kg of styrene, and 510 g (3%) of pulverulent graphite (Graphitwerk KropfmUhle KG, UF2 96/97, average particle size 4.5 μm) are homogeneously suspended with admixture of 59.6 g of dicumyl peroxide and 20.4 g of dibenzoyl peroxide. The organic phase is introduced into 19.5 l of demineralized water in a 50 l stirred vessel. The aqueous phase comprises 69.8 g of sodium pyrophosphate and 129.5 g of magnesium sulfate. The suspension is heated, with stirring, to 80° C. and 3.51 g of sodium sec.-$C_{15}$-alkylsulfonate are added, whereupon the suspension stabilizer system forms. The stirrer rotation rate here was 140 rpm. Finally, the polymerization is completed at 134° C. Removal of the aqueous phase gives bead-shaped pellets comprising 8% of water.

Using air heated above 100° C., the product could be expanded to one 8th of its initial bulk density of about 600 g/l. The prefoamed product was then dried and foamed using steam in a second and a third expansion step to a bulk density of 10 g/l.

EXAMPLE 2

2.55 kg of polystyrene (PS 158 K from BASF) are dissolved in 17.03 kg of styrene, and 340 g (2%) of pulverulent carbon black (MT N 990, Degussa AG, average particle size 320 nm) are homogeneously suspended with admixture of 59.6 g of dicumyl peroxide and 20.4 g of dibenzoyl peroxide. The organic phase is introduced into 19.5 l of demineralized water in a 50 l stirred vessel. The aqueous phase comprises 69.8 g of sodium pyrophosphate and 129.5 g of magnesium sulfate. The suspension is heated, with stirring, to 800° C. The stirrer rotation rate here was 140 rpm. After 140 minutes 3.51 g of alkyl sulfonate are added. Finally, the polymerization is completed at 134° C. Removal of the aqueous phase gives bead-shaped pellets comprising 11% of water.

Using air heated above 100° C., the product could be expanded to one 10th of its initial bulk density of about 600 g/l. The prefoamed product was then dried and foamed using steam in a second and a third expansion step to a bulk density of less than 10 g/l.

We claim:

1. A process for preparing expandable polystyrene beads which comprises water as sole blowing agent by polymerizing styrene in aqueous suspension in the presence of magnesium pyrophosphate or tricalcium phosphate as suspension stabilizers, where the suspended styrene droplets comprise an emulsion of finely dispersed water and an emulsifying agent is present, which comprises adding, as emulsifying agent, at the start of the suspension polymerization or during its course, from 0.1 to 15% by weight, based on styrene, of carbon black or graphite having an average particle size of not more than 100 $\mu$m and a density above 1.1 g/cm$^3$.

2. A process as claimed in claim 1, wherein carbon black with an average particle size of from 10 to 500 nm or graphite with an average particle size (longest lamellar diameter) of from 2 to 20 $\mu$m is added.

3. A process as claimed in claim 1, wherein the solid substance is added to the polymerization batch at a conversion of from 0 to 90%.

4. A process as claimed in claim 1, wherein the polymerization is carried out in the presence of from 1 to 30% by weight, based on styrene, of polystyrene dissolved in the monomer.

5. A method for producing foamed polystyrene beads, comprising:

foaming expandable polystyrene beads comprising 2 to 20% by weight of water and prepared as set forth in claim 1 with air at a temperature ranging from 110 to 140° C. or by superheated steam.

6. A process for preparing expandable polystyrene beads which comprises water as sole blowing agent by polymerizing styrene in aqueous suspension in the presence of magnesium pyrophosphate or tricalcium phosphate as suspension stabilizers, where the suspended styrene droplets comprise an emulsion of finely dispersed water and an emulsifying agent is present, which comprises adding, as emulsifying agent, at the start of the suspension polymerization or during its course, from 0.1 to 15% by weight, based on styrene, of carbon black or graphite having an average particle size of not more than 100 $\mu$m and a density above 1.1 g/cm$^3$, the expandable polystyrene beads containing from 2 to 20% by weight water.

* * * * *